United States Patent

Cheron et al.

Patent Number: 5,585,188
Date of Patent: Dec. 17, 1996

[54] PANE HAVING IMPROVED PROPERTIES

[75] Inventors: Jean Cheron, Les Bordes; Pierre Chaussade, Sully-sur-Loire, both of France

[73] Assignee: Saint-Gobain Vitrage International, Courbevoie, France

[21] Appl. No.: 374,525

[22] PCT Filed: Jun. 16, 1994

[86] PCT No.: PCT/FR94/00723

§ 371 Date: May 30, 1995

§ 102(e) Date: May 30, 1995

[87] PCT Pub. No.: WO95/00451

PCT Pub. Date: Jan. 5, 1995

[30] Foreign Application Priority Data

Jun. 22, 1993 [FR] France .................... 93 07499

[51] Int. Cl.$^6$ ............................................. B32B 9/00
[52] U.S. Cl. ................. 428/426; 428/34; 428/68; 428/76; 428/192; 428/412; 428/437; 428/423.1; 428/425.6; 428/911; 428/913; 52/308; 52/309.1

[58] Field of Search .................. 428/76, 426, 437, 428/911, 192, 194, 343, 417, 423.1, 68, 424.2, 34, 425.6, 428, 913; 52/308, 399

[56] References Cited

U.S. PATENT DOCUMENTS

| 4,321,777 | 3/1982 | Sauret et al. | 52/308 |
| 5,082,736 | 1/1992 | Bravet et al. | 428/425.6 |
| 5,279,882 | 1/1994 | Daude et al. | 428/192 |

*Primary Examiner*—Patrick Ryan
*Assistant Examiner*—Abraham Bahta
*Attorney, Agent, or Firm*—Oblon, Spivak, McClelland, Maier & Neustadt, P.C.

[57] ABSTRACT

The invention concerns a monolithic or laminated pane of glass or of plastic materials which contains at least one glass sheet (8, 9). The edge face of the glass sheet is at least partly covered with a protective strip (11, 12) of elastomeric material which has a hardness less than 90 shore A. The protected strip is adhered to the edge face. The strip serves to protect the sheet from any shock or impact it receives during processing prior to assembly into a pane for use in aircraft or transportation vehicles.

20 Claims, 2 Drawing Sheets

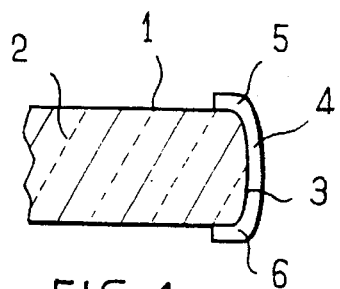
FIG_1a
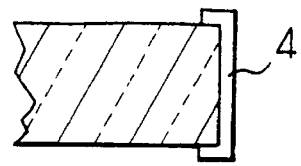
FIG_1d
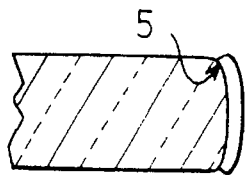
FIG_1b
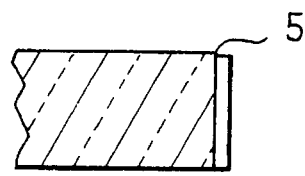
FIG_1e
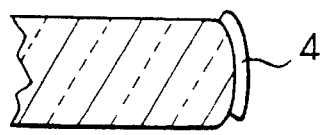
FIG_1c
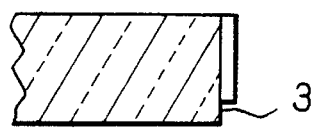
FIG_1f
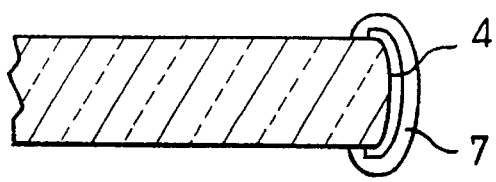
FIG_2
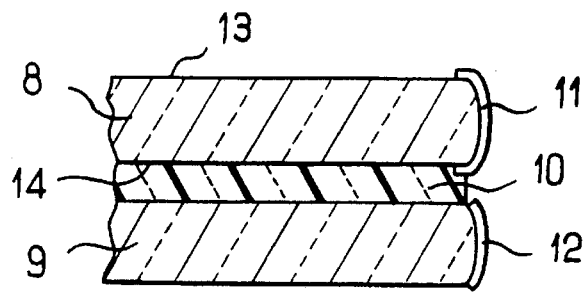
FIG_3

PANE HAVING IMPROVED PROPERTIES

BACKGROUND OF THE INVENTION

This invention relates to a pane, notably a pane used in the aeronautical sector.

The pane may be monolithic or laminated, of glass or of plastics material, or it may also be a composite pane composed of an assembly of rigid sheets, of glass and/or of plastics material, and of flexible sheets.

A composite pane used in the aeronautical sector is, commonly, composed of at least two sheets of thermally or chemically toughened glass, between which there is an intermediate sheet of plastics material which may, if desired, be composed of several plies or sheets.

When the pane is in the usual conditions of a high altitude flight it is subjected, on the one hand, to considerable differences of pressure between its two faces and, on the other hand, to also considerable differences of temperature between the median part and the peripheral part of the pane. Furthermore, it is also subjected to vibrational loadings. As indications, the pressure difference may reach 900 millibars and the temperature difference may reach approximately 70° C. To these already high stresses there can be added stresses due, for example, to an impact in flight, in particular at low temperature, such as the strike of a bird, or other local stresses.

As a result of these particularly high loadings, such panes deteriorate with use after a greater or lesser period.

Solutions have already been proposed for reducing the risks of failure of the pane. One of the most common causes of failure is the difference in the coefficients of thermal expansion of the glass and of the intermediate sheet of plastics material which is, generally, of polyvinyl butyral. One solution consists of introducing a material having a low coefficient of thermal expansion into the marginal part of the pane, between the intermediate sheet and the glass. Another solution consists of placing a continuous film of a material of a difference nature having a lower modulus of elasticity between the intermediate sheet and the glass. These solutions may, however, lead to optical defects in the pane. There has also been proposed, in the document EP 508 864, an intermediate sheet of polyvinyl butyral composed of several plies, the plasticizer content of the plies in contact with at least one sheet of glass being higher than in the internal plies. This characteristic makes possible, also, a reduction and indeed an elimination of the known stresses leading to a cleavage of the glass, that is to say a rupture in a plane substantially parallel to the plane of the glass, notably when it is chemically toughened.

These panes of the earlier documents have exhibited, as a whole, improved properties. They have satisfactory working lives. Nevertheless, in certain cases, important precautions are necessary during the production of the pane.

The present invention overcomes these disadvantages.

BRIEF DESCRIPTION OF THE INVENTION

The present invention relates to a pane having the desired qualities of long life in the conditions of temperature and pressure to which a pane used in the aeronautical sector may be subjected.

The inventors have achieved this result by demonstrating the stresses to which the pane is subjected during manufacture and installation in the aircraft fuselage. The inventors have demonstrated that, in particular, during handling it was possible for the pane to be subjected to shocks or impacts creating micro-defects which, although not visible, could cause deterioration of the pane. The inventors have also determined the characteristics for overcoming these defects and have found a solution compatible with the demands of the aeronautics industry and offering the advantage of being, in addition, easy to carry out.

The invention concerns a pane, the edge face of which is at least partly covered by a strip or band.

In one of its aspects, the invention concerns a pane comprising at least one sheet of glass, the edge face of which is, at least partly, covered by a protective strip.

The material forming the strip according to this invention is chosen from among the following materials: silicone, rubber, thermosetting or thermoplastics elastomers. The material must be compatible, in particular, with the intermediate sheets or layers of plastics material used and with the seals that are generally installed at the periphery of the pane. These are seals for leak tightness and/or installation and/or removal, for example. These seals can be extruded or encapsulated. They are commonly of silicone. Furthermore, the material used according to this invention is, preferably, light in weight, that is to say with a density advantageously less than 1.2 g/cm$^3$.

The strip of this invention is preferably of polyurethane. The hardness of the strip is preferably higher than that of the seal in order to obtain a good assembling connection. It is preferably less than 90 Shore A and is, for example, between 60 and 90 Shore A. It is preferable, in addition, for the strip to have a good tear resistance. This is, preferably, higher than 2 kg measured according to standard ASTM 1938 and can even be as high as a value of the order of 2.5 kg.

Preferably, the strip is left on the pane, which is mounted in the cockpit or fuselage of the aircraft. As we have seen earlier, the pane then undergoes considerable thermal stresses. For these reasons, the strip has a thermal dimensional stability after 30 minutes at 120° C. of less than 1%. Moreover, according to one advantageous variant of the invention, the strip covers, at least partly, the edge face of at least one sheet of glass and, preferably, of each of the glass sheets, taken individually, that form part of the pane. The strip is preferably applied onto the glass sheet before the manufacturing cycle for the pane. The glass sheet is then protected by the strip from any loadings from the start right to the end of the manufacturing steps and the installation of the pane. The strip should then have a thermal dimensional stability such that is withstands the heating conditions during assembly, which may reach more than 100° C. under pressure of 10 bars or more.

The total thickness of the strip is preferably between 0.1 and 2 mm. The greater the thickness, the more will the strip according to this invention possess improved properties, in particular energy-absorber properties. Nevertheless, preferably, this thickness does not exceed 2 mm for reasons of bulk. It is obvious that each constituent of the pane has precise dimensions and that the dimensions of the whole of the pane must correspond exactly to the intended location provided in the body of the aircraft, for example. Furthermore, the edge faces of the pane are relatively of considerable size due, in particular, to the presence of various functional elements such as connecting, guiding elements and the presence of a seal or seals.

Because of the small space available, the strip according to this invention advantageously comprises an adhesive film which, by the simple application of a pressure, enables the strip to be firmly fixed to the pane. The pressure may be applied, for example, by the application of a grooved roller, a spatula or any other means. The adhesive film is, preferably, of the acrylic type; it has a thickness of the order of 0.01 to 0.2 mm. The thickness is, preferably, of the order of 0.05 mm. The strip is advantageously unrolled from an unreeling device and immediately afterwards is applied against the edge face of the pane and, possibly also, may project onto the faces of the pane. The strip is thus applied uniformly in a simple and practical manner, in spite of the small thickness of a glass sheet, the thickness of which may, for example, be as small as 3 mm and in spite of the shape of the edge face which may, for example, be rounded.

The glass sheet covered according to this invention is advantageously a sheet of chemically toughened glass, that is to say strengthened by a chemical treatment, itself known. This treatment consists, for example, of an ion exchange in the surface layers of the glass, the ions of small size being replaced by ions of larger size. This ion exchange creates a surface zone in compression. The strength of this surface zone in compression is particularly high. However, its thickness is less than that of a glass sheet that is thermally toughened. The present invention reduces the risk of deterioration of the surface of the glass during awkward or incorrect handling.

DESCRIPTION OF THE DRAWINGS

Other characteristics and advantages of the invention will become apparent from the remainder of the description, prepared with reference to an example of embodiment and to the figures, in which:

FIG. 1 comprises various schematic layouts 1a to 1f, showing difference possible positions of the strip according to this invention, FIG. 2 shows, in section, one embodiment of a pane according to the invention, FIG. 3 shows, in section, a variant of a pane according to the invention.

DETAILED DESCRIPTION OF THE INVENTION

Figure 4:
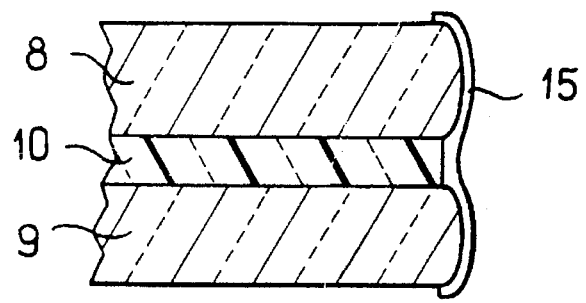
FIG. 4 shows, in section, another variant of a pane according to the invention.

FIG. 1 shows a monolithic pane 1 composed on one sheet 2. This sheet is, for example, of glass. Its edge face 3, the arrises of which are referenced 5 and 6, is covered with a strip 4 according to the invention. In the arrangements 1a to 1c, the edge face 3 is rounded, whereas it is straight in the arrangements 1d to 1f. As illustrated in arrangements 1a and 1d, the strip may project onto the faces of the sheet 2. It may also project only on one face. It may moreover not project, while still protecting, for example, the arris 5 or the arris 6, as illustrated in arrangements 1b and 1e. It may also cover only a part of the edge face of the pane, as illustrated in arrangements 1c and 1f, while still protecting or not protecting the arris 5 and/or the arris 6.

Only a few arrangements are illustrated in these schematic drawings. Other arrangements are, of course, possible without departing form the spirit of the invention.

The pane according to this invention has improves properties, in particular an improved resistance to shock or impact. The results of tests carried out on the pane shown in arrangement 1a are as follows:

The glass sheet is chemically toughened. If a steel ball is dropped on the rounded top of the glass sheet, simulating impacts during handling, defects are observed when the ball has an energy greater than or equal to 0.1 joule. If the same test is performed on the pane shown in arrangement 1a, provided with a strip of the silicone type, defects are observed for an energy of 0.5, 1 or 2 joules depending upon the thickness of the silicone strip, which is 1, 2 or 3 mm respectively.

If the strip is composed of a polyurethane having a Shore A hardness of 80, a thickness of 0.41 mm and a tear resistance of the order of 2.6 kg according to test referenced ASTM 1938, defects appear for an energy greater than or equal to 9 joules.

Furthermore, the strip is firmly fixed to the glass sheet. It is fixes there by an adhesive film of the acrylic type of thickness 0.04 mm. The adhesion values measured with a polyurethane strip described above are of the order of 1N/mm.

These values are measured according to the test known at 180° peeling test, described in standard ASTM-D-100. The specimen tested are left for 24 hours at ambient temperature. The pulling speed in this case is 305 mm/min.

As an indication, the drop test with a steel ball of 50 mm diameter and mass 500 g is performed on a plane specimen covered with a polyurethane strip according to the invention, as described above. This test simulates the shocks that the pane can experience during handling. The glass breaks for an energy greater than or equal to 10 joules whereas, for the same bare glass sheet, that is to say without a strip, the limiting energy is 3 joules. This example illustrates the improved properties of the pane according to this invention and the brittleness of the edges of the pane which can lead to breakage of the pane.

As illustrated in FIG. 2, with advantage, a seal 7 is mounted at the periphery of the pane. This seal is preferably a leak tight and/or installation/removal seal. It is extruded or encapsulated. The pane 1 then comprises a so to speak composite seal, composed of the strip 4 according to the invention disposed according to arrangement 1a of FIG. 1, and of the seal 7. The strip may also be disposed in a different arrangement. It is then ready to be mounted in a bodywork opening or in a frame of a window or door, or in the cockpit or fuselage of an aircraft.

The seal is, in this example, of silicone of thickness 2 mm, produced by encapsulation. The strip is, in this example, of polyurethane like that described in relation to FIG. 1. Defects appear when the energy of a steel cylinder falling onto the rounded top of the pane covered both with the strip 4 and the seal 7 is greater than or equal to 20 joules.

Figure 5:
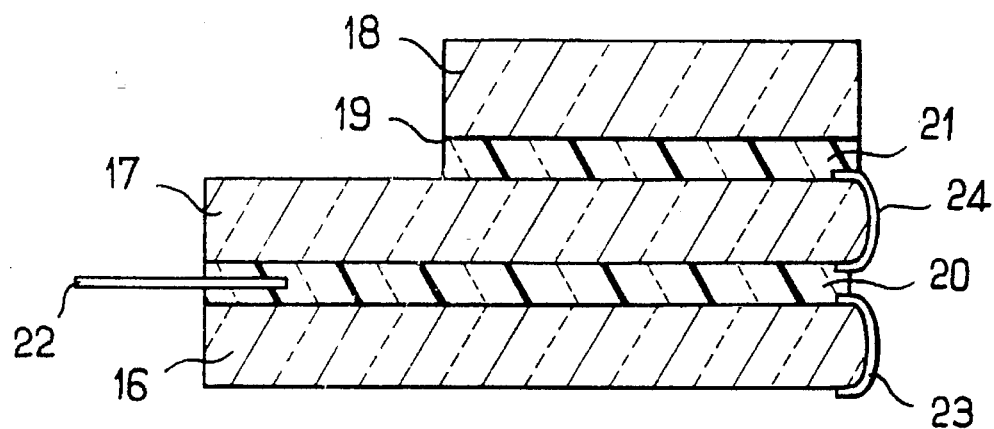
FIG. 5 shows, in section, another variant of a pane according to the invention.

The glass sheets illustrated in FIGS. 1 or 2 may also form part of a laminated pane as shown, for example, in FIGS. 3 and 5.

FIG. 3 shows a laminated pane composed of two glass sheets 8 and 9, between which is an intermediate sheet of flexible plastics material 10. This intermediate sheet, shown schematically, may itself comprise several plies or sheets, possibly of different materials. In the figure two strips, 11 and 12, surround respectively the edge faces of the sheets 8 and 9. In this figure, the strip 11 is shown projecting onto the faces 13 and 14 of the sheet 9, whereas the strip 12 does not project. The figure thus illustrates the different possible positions of the strips relative to the sheets and the different possible superpositions of rigid or flexible sheets, without departing from the spirit of the invention. A seal, not illustrated, may also cover the whole of the edge face of the thus constituted pane.

FIG. 4 illustrates another variant of the invention, in which the strip 15 according to the invention covers the entirety of the laminated pane. It is then applied after the assembling and does not need to be able to withstand, for example, the pressure and temperature conditions required for such an assembling.

This pane may be used for transportation vehicles, for buildings etc.

Figure 6:
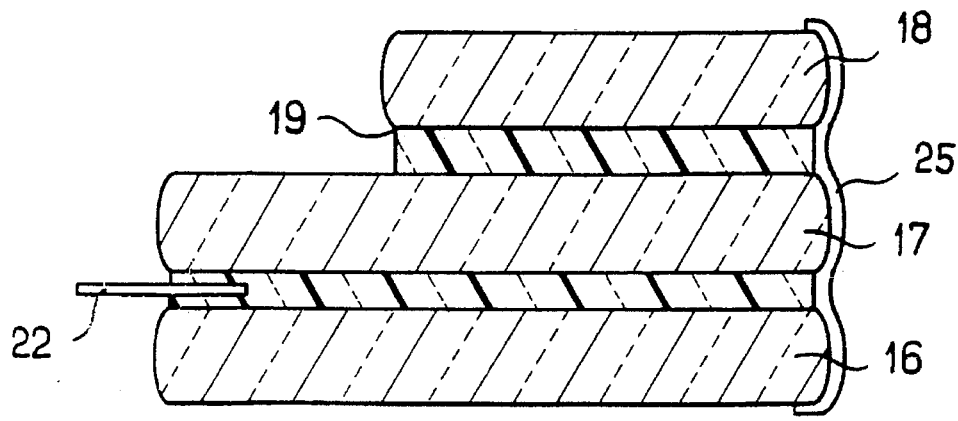
FIG. 6 shows, in section, another variant of a pane according to the invention.

FIGS. 5 and 6 illustrate panes for aircraft according to a preferred variant of the invention. They are composed of three glass sheets 16, 17 and 18. The glass sheets 16 and 17, in particular the sheet 16, are exposed to the pressure and temperature obtaining inside the aircraft. The sheet 18 is, itself, exposed to the external conditions. A heating network 19 is usually provided in proximity to the sheet 18 for the purpose of removing the frost and/or mist from the pane. It is composed of electrical heating wires, not illustrated, electrically connected to electrical feeder strips, themselves connected via a connection element to an electrical supply source. Conductor wires for eliminating the static charges may also be provided.

Intermediate sheets of plastic 20 and 21 are provided between the glass sheets. These are usually one or more sheets of polyvinyl butyral, optionally composed of several plies. In the embodiment illustrated here, the sheets 16 and 17 and also the intermediate sheet 20 are larger than the sheet 18 and the intermediate sheet 21. The intermediate sheet 21 may also be of the same dimensions as the sheet 17, for example. The intermediate sheet 20 is generally reinforced by a peripheral belt or insert, shown at 22, embedded in the intermediate sheet. This belt may comprise, if desired, holes for mounting the pane by bolting to the structure of the aircraft. This belt may be of an inoxidizable metal, of aluminium or based upon a fibrous structure. Its thickness is of the order of 2 mm.

The strips 23, 24 according to the invention may cover the edge face of the sheets 16 and 17 as shown in FIG. 5. The strips 23 and 24 cover, at least partly, the edge face of the sheets 16 and 17, respectively, considered individually. These sheets are, of course, covered before they are assembled together, preferably just after they are manufactured. The strips may also cover the whole of the pane, as shown at 25 in FIG. 6. The strips 23, 24 and 25 may project or not onto the faces of the glass sheets, may cover in totality or only partly the edge faces of the sheets or of the pane.

FIG. 5 illustrates an advantageous variant, in which the sheets 16 and 17 are of chemically toughened glass and, in addition, have a rounded edge. The sheet 18 may also be covered with a strip according to this invention.

The method of production of a pane according to the invention, notably a laminated pane, comprises the following steps.

A strip according to this invention is applied onto the edge face of a glass sheet, which has just undergone a chemical toughening treatment. The strip, comprising an adhesive film, is unreeled from a feeder device and is applied against the edge face, projecting if desired onto one or both faces of the glass sheet. With advantage, the application is performed by means of a grooved roller, to make the application highly uniform. The strip thus protects the glass sheet right from the start of the production cycle for the pane. A protective wrapping film may enclose the entirety of the glass sheet. This glass sheet can be stored. It is then assembled with other glass sheets, themselves perhaps also provided with strips according to this invention. The wrapping film, if provided, is of course removed before assembling.

With advantage, several plies or sheets of flexible plastics material are disposed between these glass sheets, as well as a heating network, antistatic network, reinforcing belt etc. This assembly is preassembled by a calendering technique or by introducing the assembly into a bag, subjected to heat and placed under vacuum. The preassembly is then introduced into an autoclave, where it is subjected to a temperature of the order of 100° C. at 10 bars pressure. On leaving the autoclave, the assembly is firm and solid, that is to say the different plies constituting an intermediate sheet and also the intermediate sheet and the glass sheets are intimately bonded together. A silicone seal is then moulded onto the periphery of the pane. A wrapping film may, if desired, protect each of the faces of the pane. This pane is then mounted in the body of the aircraft by bolting or by mechanical fixing, for example by gripping. The wrapping film is, if present, then removed.

The invention concerns monolithic or laminated panes, provided or not with a seal or any other element of glass or plastics material, without departing from the spirit of the invention.

Although the invention has been described only in relation to panes used in the aeronautical industry, it may also be used for transportation vehicles or buildings or ships.

We claim:

1. A monolithic or laminated pane of glass or plastic material for use in aircraft or transportation vehicles comprising at least one sheet of glass or plastic having an edge face, and a protective strip of elastomeric material adhered to said edge face and at least partly covering said edge face, said strip having a hardness less than 90 Shore A.

2. A pane as set forth in claim 1, wherein said elastomeric material of said protective strip is selected from the group consisting of silicone or polyurethane.

3. A pane as set forth in claim 2, wherein said elastomeric material is a polyurethane.

4. A pane as set forth in claim 3, wherein said polyurethane has a Shore A hardness in the range between 60 and 90 Shore A.

5. A pane as set forth in claim 1, wherein said strip has a tear resistance higher than 2 kg, measured according to ASTM 1938.

6. A pane as set forth in claim 1, wherein said elastomeric strip has a thickness between 0.1 and 2 mm.

7. A pane as set forth in claim 1, wherein said elastomeric strip includes an adhesive film component for bonding said protective strip to said edge and said adhesive film component of said strip has a thickness in the range 0.01 to 0.2 mm.

8. Pane according to claim 7, characterized in that the adhesive film is of the acrylic type.

9. A pane as set forth in claim 7, wherein said strip is capable of being unrolled from an unreeling device.

10. A pane as set forth in claim 1, which further comprises a seal mounted as the periphery of the pane, said strip being located between the edge of said glass or plastic and the inner surface of said seal.

11. A pane according to claim 1, wherein said pane comprises glass and said glass is chemically toughened.

12. A pane according to claim 1, wherein said pane is laminated.

13. A pane according to claim 4, wherein said pane is laminated.

14. A pane according to claim 10, wherein said pane is laminated.

15. In the process of preparing a glass laminate for aircraft, said glass laminate comprising a plurality of glass sheets having edge faces, the improvement comprising adhesively boding a protective strip of elastomeric material to at least part of the edge face of at least one of said glass sheets prior to assembly and lamination of said sheets to form a laminated assembly.

16. The process of claim 15, wherein at least those sheets exposed to the pressure and temperature obtained inside the aircraft are protected by said elastomeric strip.

17. The process of claim 15, wherein said laminate is composed of three glass sheets and the edge faces of all of said glass sheets are protected by said strip.

18. The process of claim 15, wherein after lamination, said glass sheets are intimately bonded together and a silicone seal is subsequently molded onto the periphery of the laminated pane, said strips being intermediate the silicone seal and said edge faces of said glass sheets.

19. The process of claim 15, wherein said strip is unrolled from an unreeling device and immediately afterwards is applied against the edge face of at least one of said sheets.

20. Pane according to claim 1, characterized in that the edge face of the pane is rounded.

* * * * *